Jan. 5, 1971  F. B. ECK  3,552,222

POWER TRANSFER DEVICE

Filed Nov. 14, 1968  4 Sheets-Sheet 1

INVENTOR.
FRANCIS B. ECK
BY *Newton, Hopkins,*
*& Ormsby*
*Attorneys*

INVENTOR
FRANCIS B. ECK
BY *Newton, Hopkins,*
*& Ormsby*
*Attorneys*

Jan. 5, 1971 F. B. ECK 3,552,222
POWER TRANSFER DEVICE
Filed Nov. 14, 1968 4 Sheets-Sheet 3
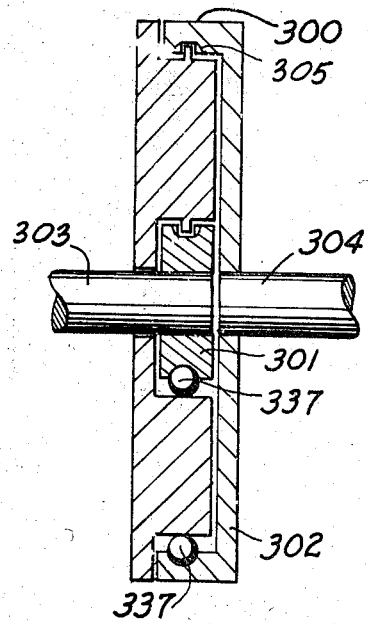
Fig. 9
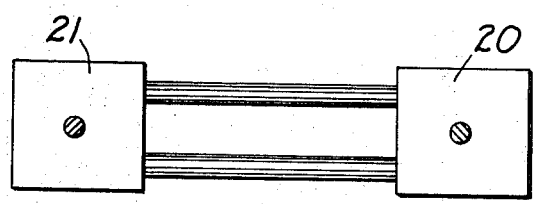
Fig. 10
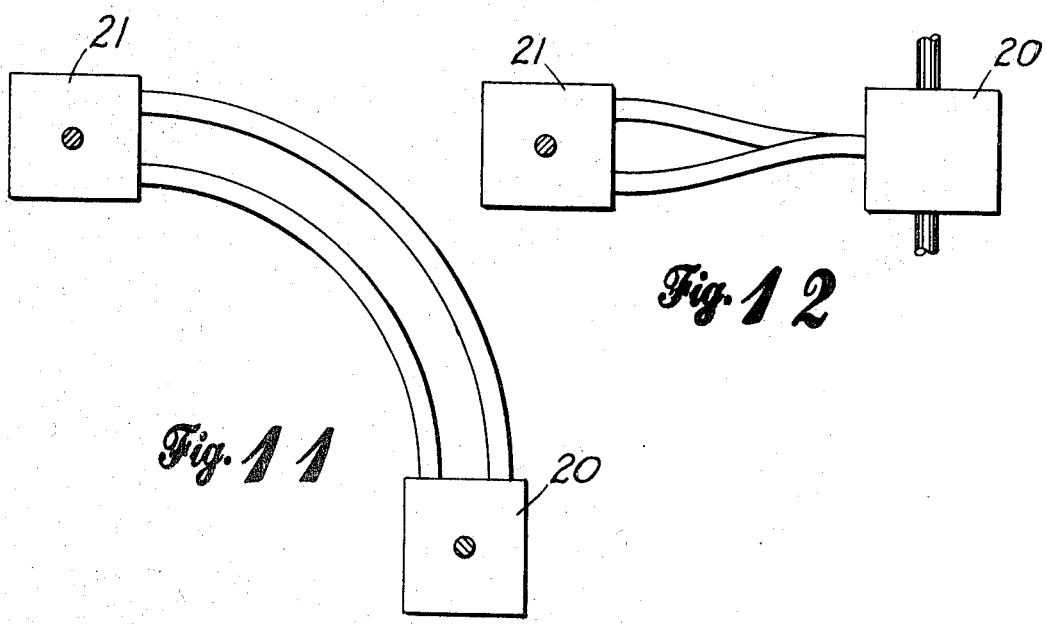
Fig. 11
Fig. 12
INVENTOR.
FRANCIS B. ECK
BY *Newton, Hopkins,
& Ormsby*
*Attorneys*

Jan. 5, 1971   F. B. ECK   3,552,222
POWER TRANSFER DEVICE

Filed Nov. 14, 1968   4 Sheets-Sheet 4

INVENTOR.
FRANCIS B. ECK
BY: *Newton, Hopkins, & Ormsby*
*Attorneys*

United States Patent Office 3,552,222
Patented Jan. 5, 1971

3,552,222
POWER TRANSFER DEVICE
Francis B. Eck, 605 Brookline Drive SE.,
Marietta, Ga. 30060
Filed Nov. 14, 1968, Ser. No. 784,504
Int. Cl. F16h 5/00
U.S. Cl. 74—216.3                                 6 Claims

ABSTRACT OF THE DISCLOSURE

A power transfer device having a pair of sprocket housings connected by a pair of flexible tubes, the tubes and the sprocket housings forming an endless track through which a plurality of juxtaposed spheres or balls are passed. The rotation of a sprocket in one housing causes transfer of the balls in their continuous path so as to rotate the sprocket in the other housing. Each sprocket is bifurcated and an arcuate member is placed adjacent the sprockets to facilitate the transfer of the balls from the housings to the tubes. A quick disconnect assembly is provided between the ports of each housing and the tubes, by which the tubes may be readily disconnected. The inadvertent discharge of the balls from the tubes and the housings is prevented by check members. The sprocket of the present invention cooperates, in certain embodiments with a rack or a worm gear or a planetary arrangement.

BACKGROUND OF THE INVENTION

This invention relates to a flexible power transfer device and is more particularly concerned with a flexible member for transferring power from one shaft to another with an increase or decrease in mechanical advantage.

In the past, power transfer devices of the present type here disclosed have been devised. U.S. Pat. No. 2,551,821 discloses such a mechanism. In this patent, a continuous path is formed between two opposed housing by hollow tubes, through which a plurality of juxtaposed balls are passed. Sprockets within the two opposed housings are contacted by the balls so that the rotation of one sprocket drives the balls for rotating the other sprocket. The prior art devices, however, have disadvantages in that the fingers of the sprockets do not facilitate the ready transfer of a ball from the sprocket into the tube. Also, if a tube became disconnected, a substantial number of the balls perhaps would be lost. Also, in making adjustments to the power transfer device of the prior art and in installing the device, difficulty is encountered in inserting the tubes into the housings and maintaining the tubes in an installed condition.

SUMMARY OF THE INVENTION

Briefly described, the present invention which obviates the difficulties described above, includes a pair of housings which respectively retain sprockets for receiving juxtaposed balls. The sprockets are connected by a pair of flexible tubes which form a continuous path between the two housings so that rotation of one of the sprockets will urge the balls in this continuous path to rotate the second sprocket. Since the tubes are flexible, the axis of rotation of the sprockets may be altered, as desired, and may be disposed along parallel, intersecting, or non-intersecting lines.

The tubes are respectively provided, at their end portions, with quick disconnect elements provided with detents which prevent the inadvertent spilling of the balls from the tube ends and the balls from the housing upon disconnection of the tubes from the housings.

In a certain embodiment of the invention, a worm gear operates in conjunction with the sprocket for driving the balls. In another embodiment of the invention the balls constitute a pinion which operates in conjunction with a rack, the rack cooperating with the sprocket. In still another form of the invention, a planetary gear arrangement is provided by the balls and sprockets so that a peripheral gear drives an inner gear or vice versa.

Accordingly, it is an object of the present invention to provide a power transfer device which can transfer power from one shaft to another, regardless of the respective positions of the two shafts.

Another object of the present invention is to provide a power transfer device of the positive displacement type wherein a shaft along one axis can be rotated to drive a movable shaft which may be shifted into an infinite number of positions.

Another object of the present invention is to provide a power transfer device which can be readily and easily assembled and disassembled. Another object of the present invention is to provide a power transfer device wherein the power is transferred by a plurality of balls riding along a continuous path, the power transfer device being readily disassembled without danger of losing the balls.

Another object of the present invention is to provide, in a power transfer device, an arrangement which will readily and easily transfer the balls carried by one tube to a second tube.

Other objects, features and advantages of the present invention will become apparent from the following description when taken in conjunction with the accompanying drawings wherein like characters of reference designate corresponding parts throughout the several views, and wherein:

BRIEF DESCRIPTION OF THE DRAWING FIGURES

FIG. 9 is a cross-sectional view taken substantially along line 9—9 in FIG. 8;

FIG. 10 is a schematic plan view of a power transfer mechanism constructed in accordance with the present invention;

FIG. 11 is a schematic plan view of a power transfer mechanism constructed in accordance with the present invention;

FIG. 12 is a schematic side elevational view of the power transfer mechanism illustrated in FIG. 10 with one of the housings having been rotated 90° from its original position;

Figure 1:
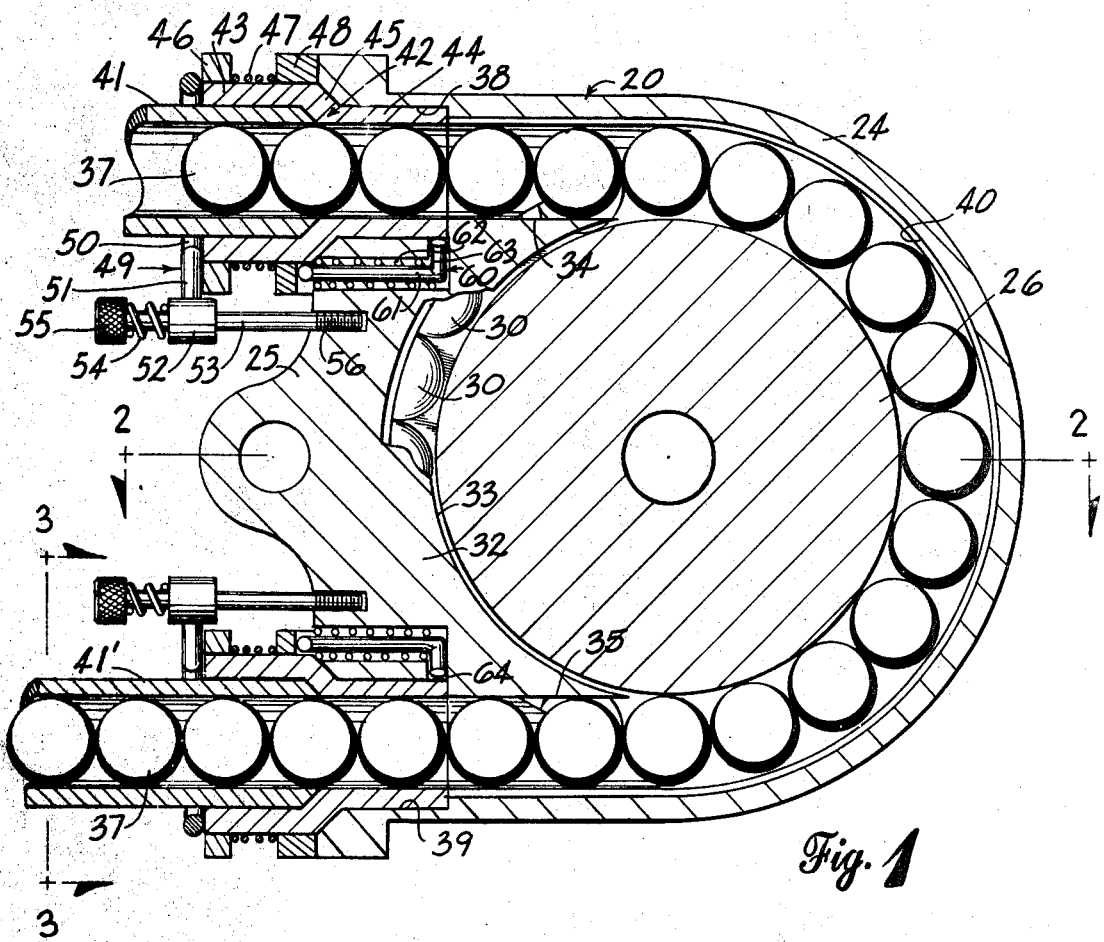
FIG. 1 is a fragmentary, vertical sectional view of one of the housings and the ends of the two tubes forming a portion of the power transfer device of the present invention.
Figure 2:
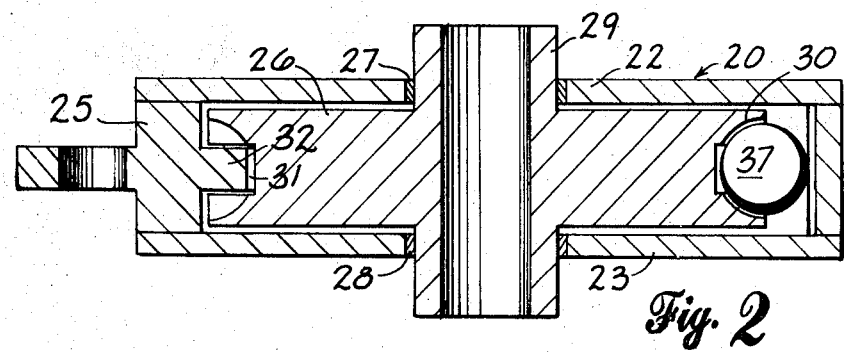
FIG. 2 is a cross-sectional view taken substantially along line 2—2 in FIG. 1.

These figures and the following detail description disclose specific embodiments of the invention, however, the inventive concept is not limited thereto since it may be embodied in other forms.

DESCRIPTION OF ILLUSTRATIVE EMBODIMENTS

Referring now in detail to the embodiments chosen for the purpose of illustrating the present invention, numeral 20 denotes generally one of the two housings of the device illustrated in FIGS. 1–5, 10, 11, and 12. The second housing 21 as seen in FIGS. 10–12 is identical to the first housing 20 except that it may be of a different size to accommodate a different sprocket, as will be more fully explained hereinafter. Therefore, the details of construction of the housing 20 will be discussed, it being understood that these details also apply to the housing 21.

The housing 20 includes a pair of spaced opposed plates 22 and 23 having semi-circular edges toward their outer portions. The edges of plates 22 and 23 are joined by a wall 24 which extends in a horizontal direction along the upper portion of housing 20 and then curves arcuately downwardly and around so as to terminate in a flat portion parallel to and spaced from the upper portion. The housing also includes an inner wall 25 which extends between the plates 22 and 23 between the upper and lower portions of the wall 24.

The plates 22 and 23 and the walls 24 and 25 define a disc shaped interior 40 within which is disposed a sprocket 26. Walls 22 and 23 are provided with central openings having bushings 27 and 28 which journal the shaft 29 of sprocket 26. Therefore, the sprocket 26 is free to rotate in the cavity created by the plates 22 and 23 and the walls 24 and 25.

The sprocket 26 is circular along its periphery and is provided with a plurality of juxtaposed pockets 30, each of which is concaved and approximately hemispherical. Extending through all of the pockets 30 is a peripheral groove 31, the bottom portion of which terminates below the bottom portion of each cup or pocket 30. The wall 25 is provided with an inwardly extending guide bar 32 which has an arcuate concaved inner surface 33, an upper surface 34 and a lower surface 35, the upper surface 34 being parallel to the lower surface 35 and both surfaces tapering toward the end portions of the arcuate surface 33 so as to intersect therewith approximately tangential to the arcuate surface 33. The bar 32 is appropriately dimensioned to be received in the groove 31.

For feeding a plurality of juxtaposed, preferably nylon balls 37 toward and away from the sprocket 26, so that the balls 37 may be carried in an arcuate path, the housing 20 is provided with an upper cylindrical opening 38 and a lower cylindrical opening 39 disposed parallel to each other, adjacent the upper and lower portions of wall 24 respectively. The holes 38 and 39 communicate with the hollow interior 40 of housing 20. The dimensions of wall 24 and sprocket 26 and the cups 30 are so arranged that as a ball 37 is moved to the right in FIG. 1 through port 38, it is received in one of the cups 30 while a successive ball 37 is received in a successive cup 30, the diameter of the cup 30 being approximately equal to the diameter of the sphere forming the ball 37. Hence, upon rotation of the sprocket 26 in a clockwise direction, as illustrated in FIG. 1, the successive balls 37, in tandem juxtaposed position, will be carried around the inner surface of wall 24 and be discharged through the opening 39 at the bottom of housing 20.

For producing a continuous path to and from the housing 20, a pair of flexible tubes 41 and 41' are provided, the interior of each tube being slightly larger than the diameter of the ball 37. A nozzle assembly, designated generally by numeral 42, is provided at the end of tubes 41 and 41', the tubes 41 and 41' extending into and affixed to the posterior of nozzle assembly 42 is received in the hole 38, the outside diameter of the anterior portion 44 being approximately the same or slightly less than the diameter of hole 38. It will also be observed that the interior or inside diameter of the nozzle assembly 42 is approximately equal to the interior diameter of the tubes 41 and 41' so that the balls 37 may readily pass therethrough and into or out of the housing 20. A tapered intermediate portion 45 connects the posterior portion 43 and anterior portion 44 together. At the posterior portion 43, there is an annular collar 46 which is preshrunk on the end of posterior portion 43 and prevents rearward movement of a coil spring 47. The coil spring 47 urges a sleeve 48 forwardly a short distance, the sleeve 48 being adapted to abut the surface of housing 20 when the nozzle assembly 40 is inserted into the housing and being adapted to yield against the compression of spring 47 when the nozzle assembly 42 is inserted to its full extent into the hole 38.

For retaining the nozzle assembly 42 in place, a latch or detent assembly 49 is provided, the latch or detent assembly including a semi-annular latch or hook 50 which has an inside diameter slightly larger than the diameter of the hose or tube 41. This hook is carried by a shank 51 which, in turn, is carried by a sleeve 52 on a shaft 53. The sleeve 52 is urged inwardly on shaft 53 by a coil spring 54 reacting against the knurled head 55 of the shaft 53. The inner end portion 56 of shaft 53 is threadedly received within a hole in wall 25 so as to dispose the shaft 53 in a position parallel to and below the hole 38. The dimensions are such that when the nozzle assembly 42 is inserted fully into the hole 38, and the sleeve 52 which is urged so as to compress the spring 54, the latch 50 will rotate, adjacent the surface of collar 46 so as to partially circumscribe the tube 41 as it projects from the posterior portion 43 of the nozzle assembly 42. This prevents any appreciable movement of the nozzle assembly 42 outwardly of hole 38, except when the latch 50 is rotated so that the nozzle assembly 42 may clear it.

Figure 5:
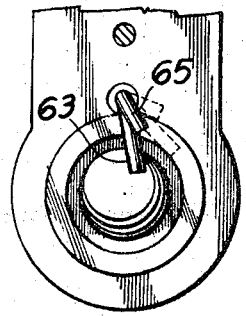
FIG. 5 is a vertical sectional view taken substantially along line 5—5 in FIG. 4.

To prevent the inadvertent spilling of balls 37 out of the housing 20, there is a detent assembly 60 disposed adjacent the hole 38. This detent assembly 60 includes a shaft 61 which is circumscribed by coil spring 62 and disposed within a bore in wall 25, parallel to and adjacent the hole 38. The inner end portion of shaft 61 is provided with an inwardly projecting finger 63 which projects through an appropriate passageway 64 into the path of balls 37. The outer end of shaft 61 is provided with a laterally extending latch arm or lever 65 which is adapted to rotate the shaft 61 and thereby manipulate the finger 63. The spring 62 urges the shaft 61 so as to position the finger 63 in the path of travel of balls which might exit from the housing 20. The lever 65, when rotated out of the path of the anterior portion 44, as it is inserted in the hole 38, will move the finger 63 out of the path of balls 37 so as to enable the nozzle assembly 42 to be inserted fully into the hole 38. In FIG. 5, the position of the lever 65 and finger 63 when the ball blocking position is illustrated is in solid lines. The rotated position of these elements is illustrated in broken lines. It is therefore seen that the detent member 60 will automatically prevent the discharge of balls from the housing 20 when the nozzle assembly 42 is removed therefrom and will automatically permit movement of the balls when the nozzle assembly 42 is inserted into hole 38.

It will be understood that the two ends of tube 41 and the two ends of tube 41' are provided with identical nozzle assemblies 42 and that the tube 41 leads from one port or hole in housing 21 to one port or hole 38 in housing 20 while the tube 41' leads from the other port or hole 38 in housing 20 to the other port or hole in housing 21.

Figure 3:
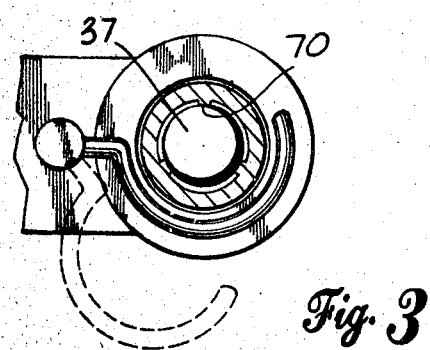
FIG. 3 is a cross-sectional view taken substantially along line 3—3 in FIG. 1.

As seen in FIG. 3, the interior of the anterior portion 44 of nozzle assembly 42 is provided with radial ridges 70 which guide the balls 37 in their path out of the nozzle and onto the edge 34 or 35, as the case may be.

It will be understood by those skilled in the art that the plurality of balls 37 form a continuous tandem or juxtaposed group of balls in two paths through the tubes 41 and 41' and around the inside surface of wall 24 of both housings 20 and 21. Upon rotation of the shaft 29 of one of the sprockets 26, the balls will be moved in the hollow cavity 40 of housing 20 so as to push the same through the interior of tube 41 and 41', depending upon the direction of rotation of the sprocket 26. This, in turn, will cause rotation of the sprocket, such as sprocket 26 in the other housing 21. The rotation, of course, will be in the direction of rotation of the sprocket 26 of housing 20.

Since the tubes 41 and 41' are flexible, the housing 21 may be disposed in an infinite number of positions, such as are illustrated in FIGS. 10, 11, and 12. Indeed, the housing 21 may be rotated with respect to the housing 20, if so desired.

Figure 6:
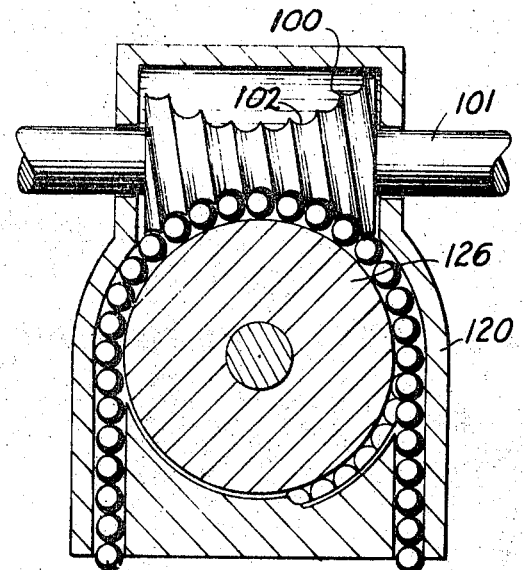
FIG. 6 is a vertical sectional view of a second form of power transfer mechanism produced according to the present invention.

In the embodiment of FIG. 6, it will be seen that, if desired, a worm gear designated generally by numeral 100 may be incorporated with a sprocket 126 which is identical to sprocket 26 in a housing 120 which is identical to housing 20, except that the housing also accommodates the worm gear 100. This worm gear is provided with a shaft 101 projecting through the housing 120 so as to dispose the worm gear 100 adjacent the periphery of sprocket 126. In such an arrangement, the periphery of the worm gear 100 defines grooves 102 which received the outer peripheral portion of each of the balls 137 so as to move the balls successively along a path, thereby rotating the sprocket 126 therewith.

Figure 7:
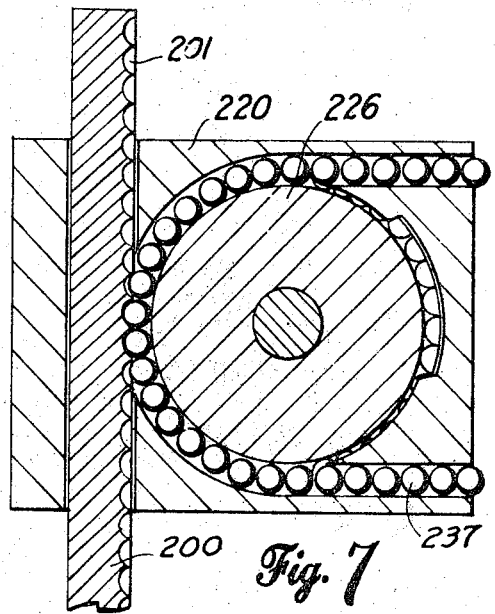
FIG. 7 is a vertical sectional view of a third embodiment of a power transfer mechanism constructed in accordance with the present invention.

In the embodiment of FIG. 7, the sprocket 226 is identical to sprocket 26 and is received in a housing 220 for moving the balls 237 in an arcuate path adjacent a slidable rack 200. The rack 200 is provided with concaved approximately hemispherical cups 201 arranged in succession so as to receive the outer peripheral portions of the successive balls 237 as they are passed by the sprocket or pinion 226 along the outer periphery of its path in housing 220. By manipulation of rack 200, the balls 237 may be caused to move either in a clockwise or counter-clockwise direction, as desired, so as to rotate the sprocket 226 in one direction or the other, or the movement of the balls 237 from some external source may cause movement of the rack 200 in either direction.

Figure 8:
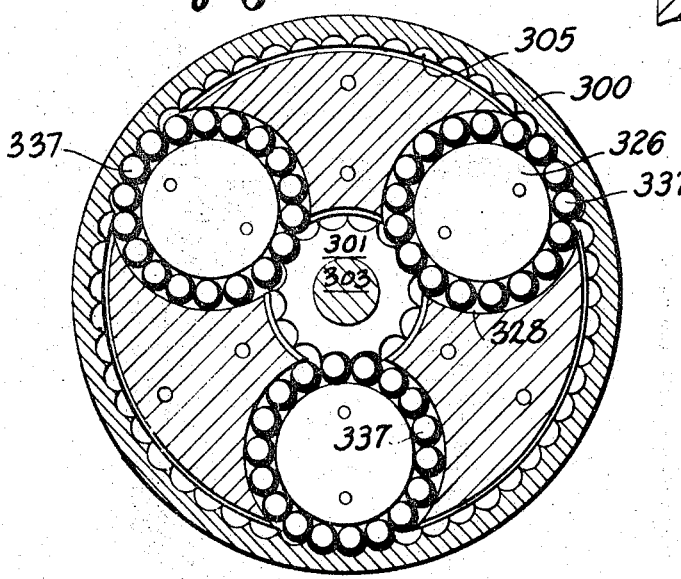
FIG. 8 is a vertical sectional view of a fourth embodiment of a device constructed in accordance with the present invention.
Figure 13:
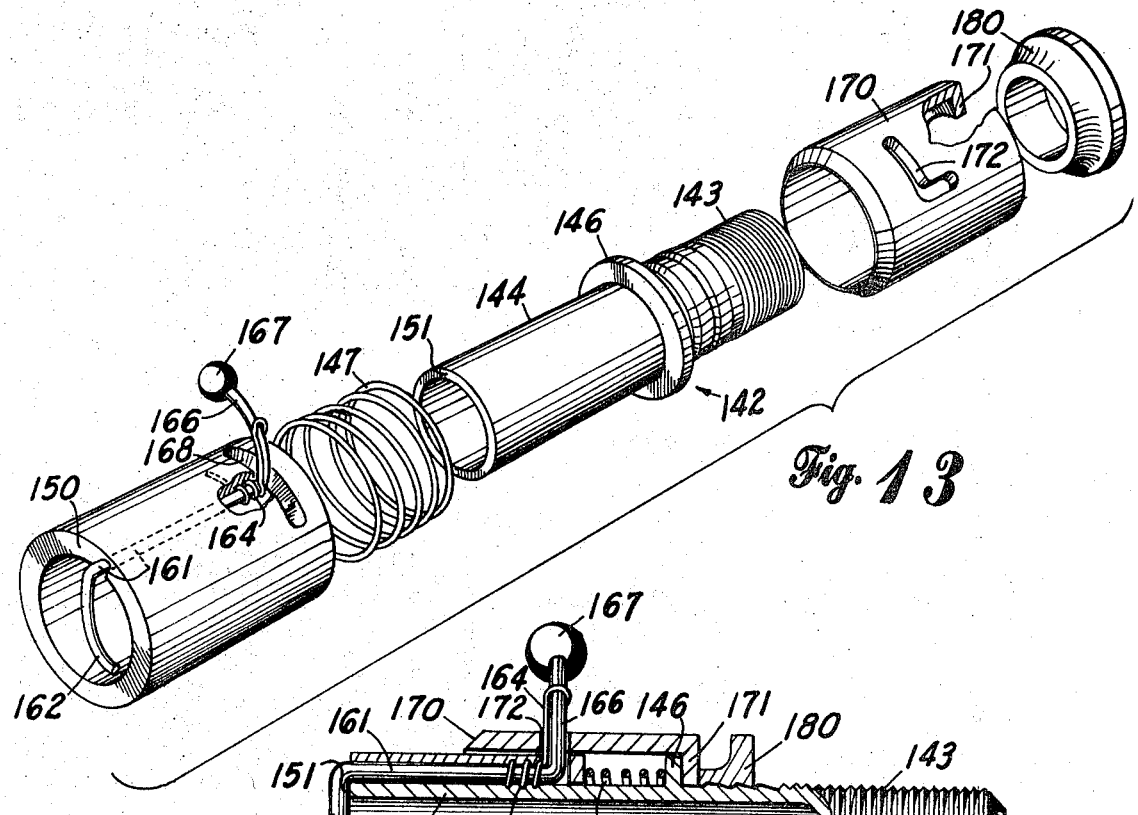
FIG. 13 is an exploded perspective view of a nozzle assembly which can be substituted for the nozzle assemblies of the preceeding embodiment.
Figure 14:
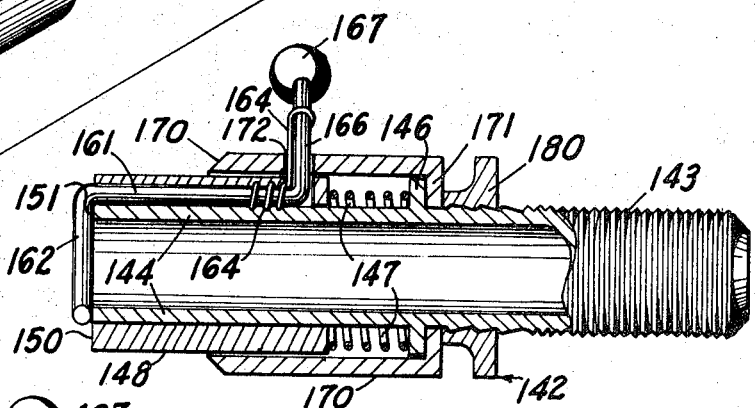
FIG. 14 is a side elevational view, partially broken away, of the nozzle assembly illustrated in FIG. 13.

In FIGS. 8 and 9, a planetary gear arrangement is provided so that an annular ring 300 can rotate or be rotated from a central sprocket 301 disposed concentrically with respect to the ring 300. The ring 300 is carried, as seen in FIG. 9, by a disc shape plate 302 connected to one side of the ring 300 so that the ring overhangs the sprocket 301. The disc 302 is carried by a shaft 304 concentric with the ring 300. Thus, upon rotation of shaft 304, the ring 300 will be rotated.

The interior periphery of the ring 300 is provided with juxtaposed cups which are approximately hemispherical and open inwardly, the cups being designated by numeral 305. These cups receive balls 337 which are arranged in three rings disposed between the central sprocket 301 and the ring 300, the circle of balls being disposed 120° from each other circumferentially. A guide member 326 having three passages 328 therein connects the balls 337 with both the sprocket 301 and ring 300. Therefore, by rotating shaft 303 connected to sprocket 301 or shaft 304 connected to ring 300, the other shaft will be rotated according to the usual planetary principles.

Figure 4:
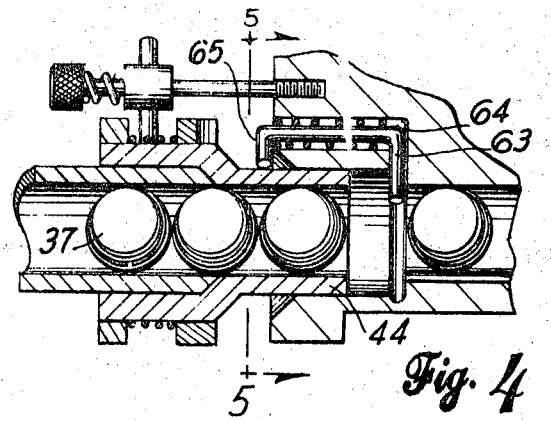
FIG. 4 is a view of a detail showing the removal of one end of the tube from a sprocket housing in the device illustrated in FIG. 1.
Figure 15:
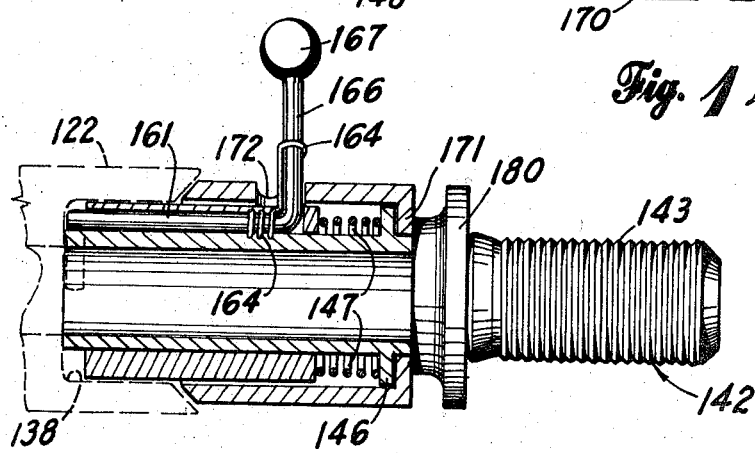
FIG. 15 is a side elevational view partially broken away, similar to FIG. 14 but showing the nozzle assembly inserted in a housing.

Referring specifically to FIGS. 13, 14, 15, and 16, it will be seen that a nozzle assembly, designated generally by numeral 142 is provided which may be substituted for the nozzle assemblies 42, seen best in FIGS. 1 and 4. The purpose of the nozzle assembly 142 is to provide a mechanism by which, when the nozzle assembly is disconnected from the housing, the inadvertent discharge of the balls, such as ball 37, from a tube, such as tubes 41 or 41', will be blocked. In more detail, the nozzle assembly 142 includes a central nozzle having a posterior portion 143 and an anterior portion 144 separated from each other by an annular shoulder 146. As seen in FIG. 15, the anterior portion 144 is adapted to be inserted into a hole or port 138 of a housing 120 and may be retained therein in the same manner as the nozzle assembly 42 of the preceding embodiment. A coil spring, 147, which acts against the annular shoulder 146, is helically wound around the anterior portion 144 for continuously urging a sleeve or color 148 forwardly so that its distal end 150 may extend even with the end 151 of the anterior portion 144 when the nozzle assembly 142 is removed from housing 120.

The sleeve 148 is sufficiently thick to be provided with a bore extending parallel to the axis of sleeve 148 throughout substantially the length of sleeve 148. This bore receives a shaft 161, the forward end of which protrudes beyond the end 150 of the sleeve 148 and is curved downwardly to provide an arcuate blocking finger 162 which has a radius equal approximately to the inner radius of the sleeve 148. Therefore, in one position of shaft 161, the finger 162 lies generally concentrical with the sleeve 148, as illustrated by full lines in FIG. 16 and in another position of shaft 161, the finger 162 projects inwardly as shown by broken lines in FIG. 16.

Figure 16:
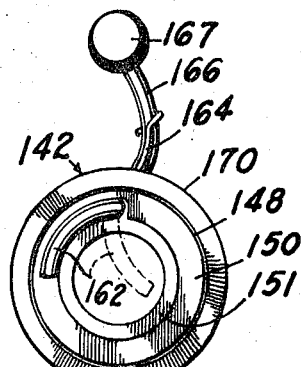
FIG. 16 is an end view of one end of the nozzle assembly illustrated in FIGS. 13, 14, and 15, the broken lines illustrating the position of the finger when it blocks the discharge of balls from a tube.

Coiled around the shaft 161 is helical spring 164 which urges the shaft 161 in a direction to move the finger 162 to the position illustrated by broken lines in FIG. 16. For manipulating the shaft, i.e., rotating the shaft 161 about its axis against spring tension of spring 164, a lever 166 is connected to the other end of shaft 161 and projects outwardly in an arcuate path, the lever 166 being provided with a know 167 at its outer end. By rotating the lever 166 in a counter-clockwise direction from its full line position to its broken line position as illustrated in FIG. 16, the finger 162 can be moved from its full line position to its broken line position. It will be seen that an appropriate slot 168 is provided in the periphery of sleeve 148 in order to permit assembly of nozzle assembly 142 and limited movement of the lever 166.

For limiting the forward movement of the sleeve 148, and for permitting limited rearward movement of the sleeve 161, an outside retaining sleeve 170 is provided, the retaining sleeve 170 having a peripheral inwardly extending flange 171 at its outer end. The flange 171 abuts the peripheral shoulder 146 to limit inward movement of the sleeve 170. The lever 166 protrudes through an L-shaped slot 172 in the sleeve 170, thereby preventing forward and rearward movement of sleeve 148 when the lever 166 is in the circumferential portion of the L-shaped slot. When, however, the lever 166 is pivoted to the position shown in full lines in FIG. 16, the lever 166 is aligned with the radially extending portion of slot 172. Hence, the finger 162 will be retracted to its non-blocking, concentric position while the lever 166 is appropriately positioned so as to permit axial movement of sleeve 148. Thus, as the nozzle assembly 142 is inserted into the port 138, and provided lever 166 is in its appropriate position, the sleeve 148 will be shifted rearwardly against spring 147 to permit the finger 162 to be disposed over the outer periphery of the posterior portion 144. A keeper ring 180 is slid over the anterior portion 143 and abuts the flange 171 so as to prevent inadvertent rearward movement of the retaining sleeve 170 and provides a bearing for a retaining latch similar to the latch 50 in FIG. 1.

It will be understood that a tube (not shown) such as tube 41 or 41' is received on the anterior portion 143 so as to feed balls through the nozzle and into the housing 120. When the nozzle assembly 142 is removed from the housing 120, spring 147 urges the sleeve 148 forwardly, whereby the lever 166 moves from the axial portion of slot 172 into the radial portion so that the spring 164 urges lever 166 in a counterclockwise direction, as viewed in FIG. 16, so that the lever 166 is moved by the spring 164 from its full line position to its broken line position, in FIG. 16. This enables the finger 162 automatically to block the discharge of balls from the nozzle assembly 142 as it is being removed.

While specific embodiments of the invention have been shown and described in detail, modifications, equivalents and substitutions may be used without departing from the inventive concept.

I claim:
1. A power transfer device comprising:
   (a) a pair of housings;
   (b) a pair of flexible tubes connecting said housings, said tubes and housings forming a continuous passageway;
   (c) a plurality of juxtaposed balls moving in said passageway;
   (d) means in one of said housings for moving said balls in said passageway;
   (e) a sprocket in the other of said housnigs, the periphery of said sprocket having successive concaved cups thereon for respectively receiving said balls;
   (f) guide means on said other of said housings cooperating with the periphery of said sprocket for guiding said balls into said cups;
   (g) quick disconnect nozzle assemblies connected to the ends of said tubes, each nozzle assembly including a nozzle on the end of the tube for projecting into an associated housing;
   (h) means for removably locking said nozzle in its position projecting into said associated housing; and
   (i) a movable finger on said associated housing for projecting into that portion of said passageway defined by said associated housing to block the inadvertent discharge of balls from said housing, said finger being movable out of the passageway as said nozzle is inserted into said housing.

2. The device of claim 1 wherein said finger is connected to a lever which is adapted to project into the path by which said nozzle is inserted into said housing, said lever when moved out of said path, moving said finger out of the path of the balls.

3. The device of claim 1 including a spring urging said finger toward ball blocking position.

4. A power transfer device comprising:
   (a) a pair of housings;
   (b) a pair of flexible tubes connecting said housings, said tubes and said housing forming a continuous passageway;
   (c) a plurality of juxtaposed balls movable in said passageway;
   (d) means in one of said housings for moving said balls in said passageway;
   (e) a sprocket in the other of said housings, the periphery of the sprocket having successive concaved cups thereon for respectively receiving said balls;
   (f) guide means on said other of said housings cooperating with the periphery of said sprocket for guiding said balls into said cups;
   (g) quick disconnect nozzle assemblies connected to the ends of said tubes, each nozzle assembly including a nozzle on the end of the tube for projecting into an associated housing; and,
   (h) means for removably locking said nozzle into its position projecting into an associated housing, said locking means including a hook pivotally mounted on said housing and engageable and disengageable with said nozzle.

5. A power transfer device comprising:
   (a) a pair of housings;
   (b) a pair of tubes connecting said housings, said tubes and said housings forming a continuous passageway;
   (c) a plurality of juxtaposed balls movable in said passageway;
   (d) means in one of said housings for moving said balls in said passageway;
   (e) a sprocket in the other of said housings, the periphery of said sprocket having successive concaved cups thereon for respectively receiving said balls;
   (f) guide means on said other of said housings and cooperating with the periphery of said sprocket for guiding said balls into said cups;
   (g) quick disconnect nozzle assemblies connected to the ends of said tubes each nozzle assembly including a nozzle on the end of the tube, said nozzle having a portion for projecting into an associated housing, a portion of larger diameter rearwardly thereof, and a tapered portion connecting the two last mentioned portions;
   (h) said associated housing having a corresponding tapered recess adapted to receive the tapered portion of said nozzle; and,
   (i) a locking means engaging said portion of larger diameter for holding said nozzle in projecting position in said housing.

6. A device as in claim 5 wherein said portion of larger diameter is provided at its rear end with a fixed collar and wherein a sleeve is slidably mounted on said portion of larger diameter forwardly of the collar, and wherein a spring is located between said sleeve and collar for urging the sleeve forwardly into a position engaging said associated housing, when the nozzle is in projecting position in said housing.

References Cited

UNITED STATES PATENTS

| | | | |
|---|---|---|---|
| 576,105 | 2/1897 | Flindall | 74—216.3 |
| 2,491,764 | 12/1949 | Quillen | 74—216.3 |

FOREIGN PATENTS

| | | | |
|---|---|---|---|
| 220,804 | 8/1924 | Great Britain | 74—216.3 |
| 144,289 | 2/1950 | Australia | 74—216.3 |

JAMES A. WONG, Primary Examiner